United States Patent [19]

Chamberlain et al.

[11] Patent Number: 4,460,215

[45] Date of Patent: Jul. 17, 1984

[54] FOLDING SEAT ASSEMBLY

[75] Inventors: Michael J. Chamberlain, Lynnwood; David R. Myers; Donald R. Furlong, both of Kirkland, all of Wash.

[73] Assignee: The Boeing Company, Seattle, Wash.

[21] Appl. No.: 307,176

[22] Filed: Sep. 30, 1981

[51] Int. Cl.³ .............................................. B60N 1/10
[52] U.S. Cl. ..................................... 297/14; 297/324; 297/475
[58] Field of Search ................. 297/14, 324, 331, 332, 297/333, 335, 336

[56] References Cited

U.S. PATENT DOCUMENTS

| | | | |
|---|---|---|---|
| 1,199,002 | 9/1916 | Freise | 297/14 |
| 1,567,357 | 12/1925 | Cummings | 297/14 |
| 1,617,901 | 2/1927 | Freise | 297/14 |
| 1,964,443 | 6/1934 | Townsend | 297/324 |
| 3,594,037 | 4/1970 | Sherman | 297/14 |

Primary Examiner—Francis K. Zugel
Attorney, Agent, or Firm—Christensen, O'Connor, Johnson & Kindness

[57] ABSTRACT

A lightweight, compact flight attendant's folding seat assembly is mounted by a plurality of separate brackets to a wall in an aircraft cabin such that the well serves as a connective support structure for various subcomponents of the seat assembly. When the seat pan is pulled down into an open position against a seat return spring, cams actuated by a seat pan frame push forward on a swingably mounted seat back frame forcing the seat back into a downwardly and forwardly sloping seating orientation. The seat back frame and cooperating cams are constructed and arranged in such a way that any rearward force exerted by the occupant against the seat back frame is reacted through the cams into the supporting wall, via the mounting brackets, wherein the intervening cams transmit the load in compression and without being subjected to rotative moment so that the seat pan is not forced to close on the seated occupant. Raising the seat pan withdraws the cams and allows the seat back to swing to a vertical position for stowage along with the upwardly folded seat pan. For maximum compactness when so stowed, the seat pan frame is provided with a contoured seat cushion that complements contouring of a seat back cushion. Integrated with the seat assembly is a retractable, occupant restraint harness including a nonbinding strap guide bracket that is attached to the same wall that mounts the seat assembly and provides for smooth, retraction and pull-out of retractable shoulder straps.

4 Claims, 10 Drawing Figures

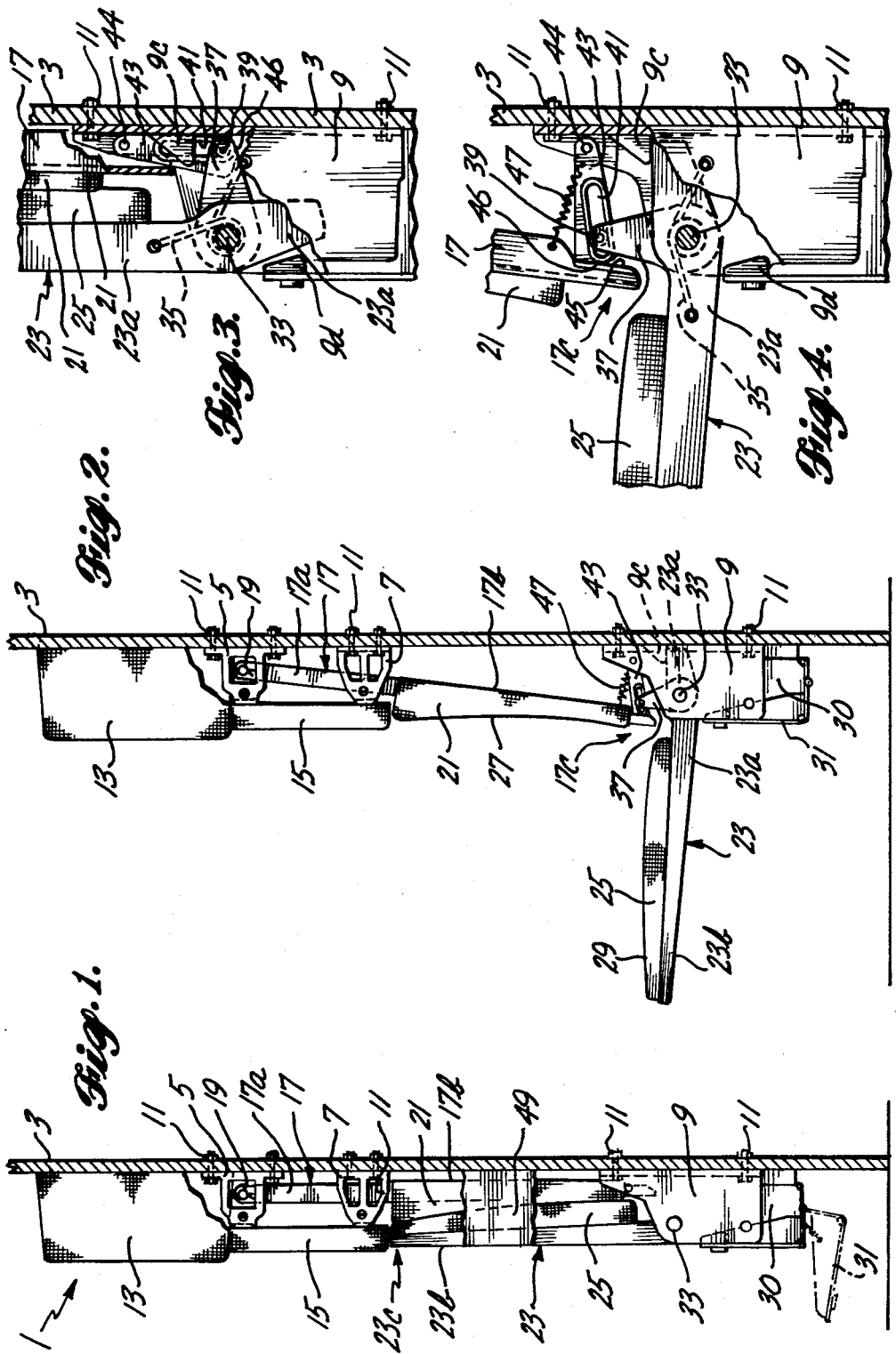

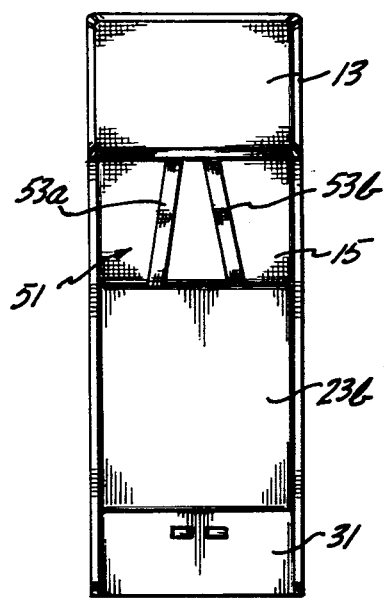
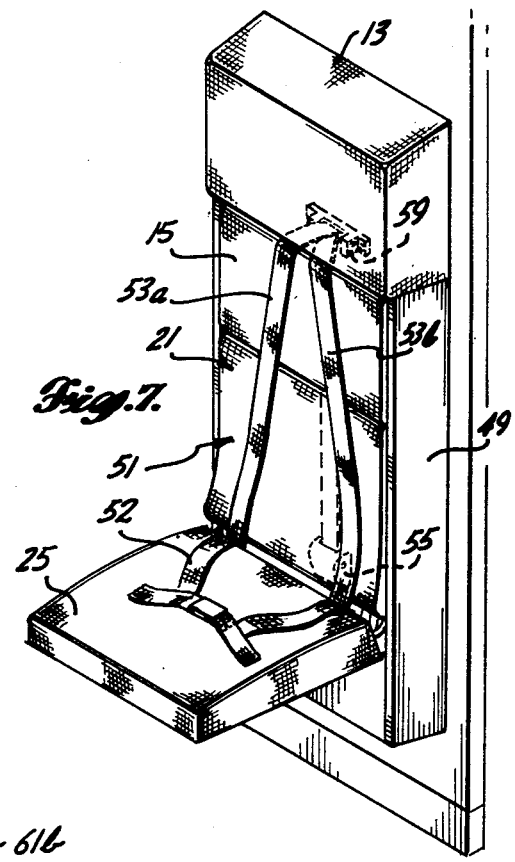
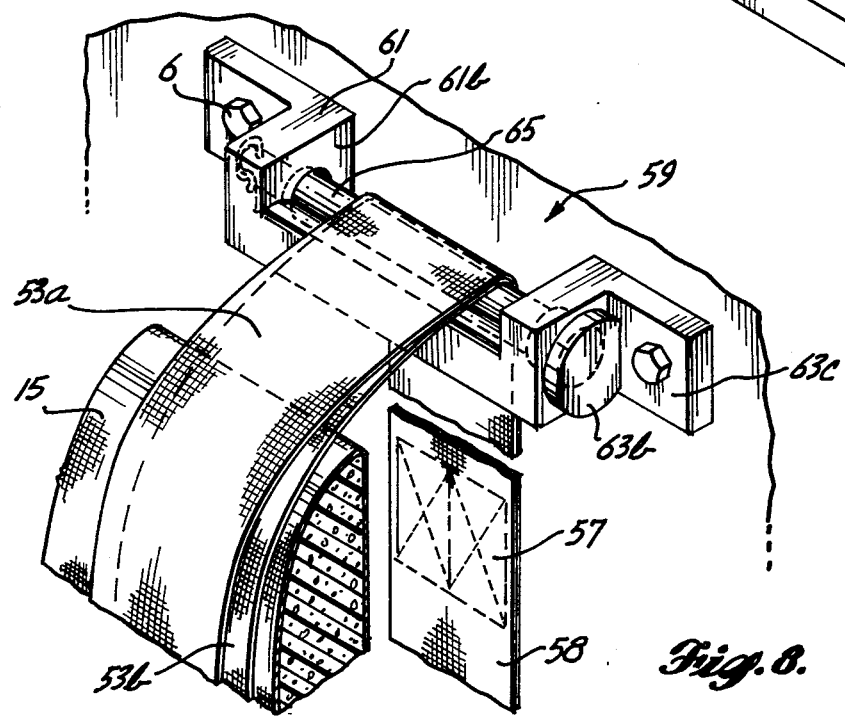

FOLDING SEAT ASSEMBLY

BACKGROUND OF THE INVENTION

This invention relates to wall-mounted folding seat assemblies and in particular to such seat assemblies designed for use by flight attendants in commercial jet aircraft.

Flight attendant seats are typically attached to a bulkhead or other vertical wall or subframe structure within the airplane fuselage at locations close to the work areas or stations. Such seat mounting locations are also usually in areas of passenger ingress and egress, and to afford room for attendant's work acitivities and such ingress and egress, the flight attendant seats are typically foldable into stowed configuration. While the seats are compactly foldable and constructed so as to be as light as possible to save space and weight, the seat must be designed to provide a high level of safety during turbulent flight conditions, or in the event of a crash.

Prior art seat assemblies of this general type while having adequate safety, do not also provide in the same seat construction, desired compactness, when stowed, desired minimum weight and the ease of installation.

Accordingly, it is the purpose and object of the present invention to provide an improved, compact, lightweight, safe seat assembly of the self-stowable (automatic) folding type.

A further object is to provide such an improved folding seat assembly which is also easy to install, to remove, and to repair.

Another object is to provide together with the improved folding seat assembly, a retractable occupant restraint harness with a nonbinding guide bracket for retractable shoulder straps.

SUMMARY OF THE INVENTION

These and other objects are accomplished according to the present invention by a folding seat assembly comprising a novel camming mechanism cooperating with an articulated seat pan frame and pivoted seat back frame in a manner that causes the seat back to be cammed forwardly into a sloping seating position when the seat pan is folded down into a seating position but prevents the application of a reciprocal closing force to the seat pan frame when an occupant is forced rearwardly against the seat back frame.

In the preferred form of the folding seat assembly, compactness and minimization of weight are achieved by employing a set of related but structurally separate mounting brackets to mount the seat pan and seat back frames to a wall which acts as both connective and supportive structure for the assembly; and by providing complementary contours on the seat cushions covering the seat pan frame and seat back frame which compactly mate when the seat is folded into a stowed position.

Incorporated with the folding seat assembly is a retractable shoulder harness restraint for the occupant in which retractable shoulder straps are passed through a nonbinding harness guide bracket that is mounted on the same wall that serves as the connective and supportive structure for the seat frames.

BRIEF DESCRIPTION OF THE DRAWINGS

FIG. 1 is a side elevational view of the folding seat assembly in a stowed position and with a lower utility compartment door open;

FIG. 2 is a side elevational view of the folding seat assembly in an open position;

FIG. 3 is a cut-away side elevational view of a seat pan frame, seat back frame and a cooperating cam shown in the seat stowed position;

FIG. 4 is a cut-away side elevational view corresponding to FIG. 3 but shown in the seat open position;

FIG. 6 is a front elevational view of the folding seat assembly and restraint in the stowed position;

FIG. 7 is an isometric view of the folding seat assembly and restraint in the open position;

FIG. 8 is a perspective view of a shoulder harness guide bracket assembly of the restraint system;

DETAILED DESCRIPTION

Figure 5:
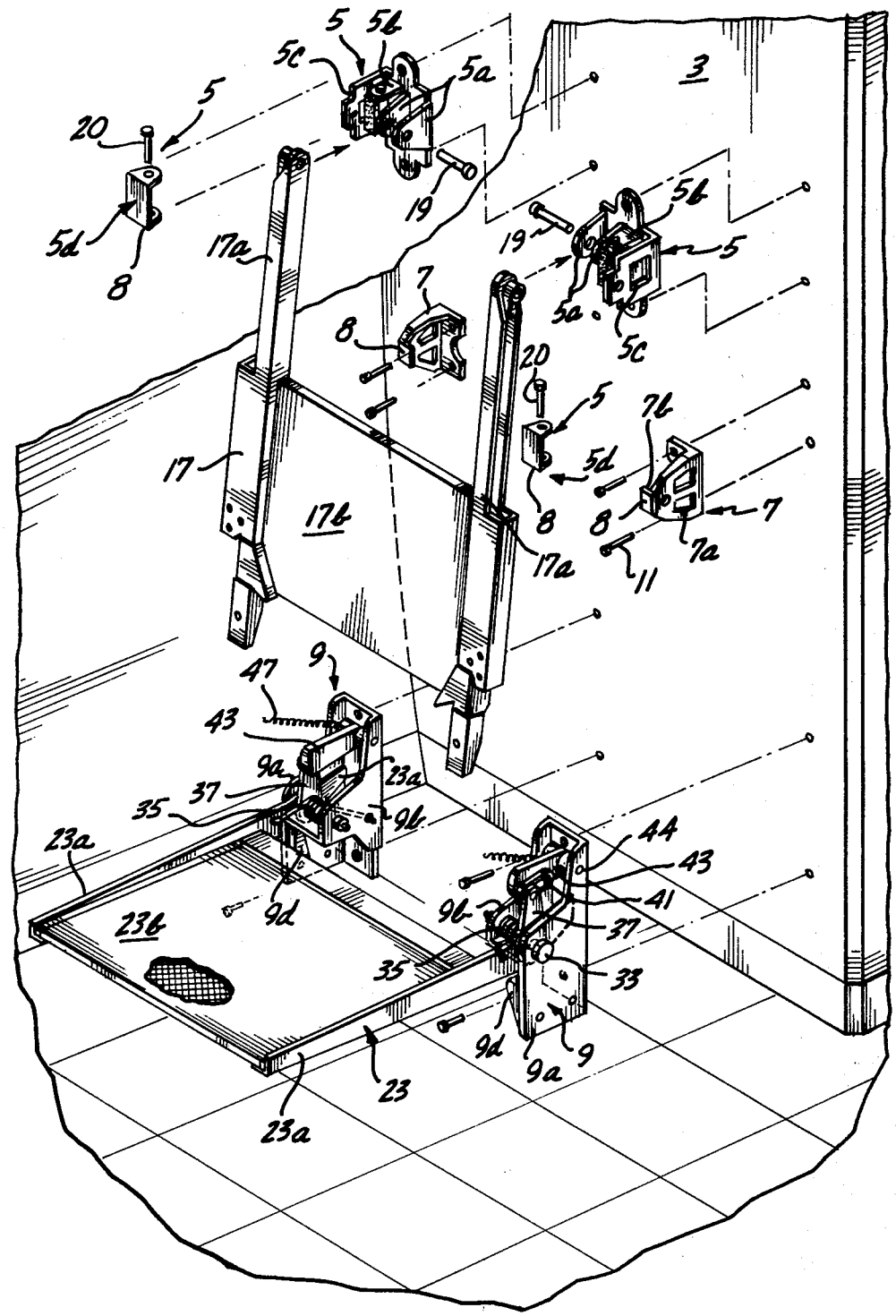
FIG. 5 is an assembly in isometric view of the seat pan frame, seat back frame, associated cams and upper, middle and lower wall mounting brackets.

In the embodiment of the invention illustrated in the drawings (see FIGS. 1 to 5), the folding seat assembly 1 is mounted on an interior wall 3 (such as a bulkhead or subframe that is anchored to seat tracks or floor hard points) of an aircraft by means of separate pairs of upper pivot brackets 5, middle brackets 7, and lower pivot brackets 9 which are individually attached to wall 3 by means of fasteners 11. A headrest 13 (FIGS. 1 and 2) is removably mounted directly to wall 3 at the top of the folding seat assembly 1 by interengageable fabric fastener strips of the hook and loop type (not shown). An upper back cushion 15 is likewise removably attached directly to the pair of upper pivot brackets 5 and the middle brackets 7, again by fabric fasteners indicated at 8 in FIG. 5.

Seat back frame 17 (FIGS. 1, 2 and 5) is pivotally connected at the upper ends of a pair of elongate frame members 17a to the upper pivot brackets 5 by pivot pins 19 and a lower back cushion 21 covers the lower portion of the seat back frame 17. The rear of seat pan frame 23 is pivotally connected at rearwardly projecting frame members 23a to the lower pivot brackets 9, with a seat cushion 25 covering the majority of the forward portion of seat pan frame 23. The lower back cushion 21 has a top-to-bottom tapering contour 27, thicker at the top and of first decreasing thickness for intermediate portions and then slightly increasing thickness near the bottom so as to exhibit a concave appearance when viewed from the side as in FIG. 2. This contouring of back cushion 21 complements a front-to-rear tapering comfort contour 29 of convex shape in a seat pan cushion 25, so that when seat assembly 1 is folded into its stowed position as seen in FIG. 1, the bottom planar surface of the seat frame panel 23b is parallel to and of minimum separation from the back planar surface of back frame panel 17b of the seat back frame 17, thus making the stowed assembly as compact as possible with minimal protrusion into the adjacent work space or passageway. Between the lower pivot brackets 9 and below the seat pan frame 23, is a utility compartment 30 having an access door 31 therefor.

As shown in FIG. 5, each of upper pivot brackets 5 has a base adapted to be fastened to wall 3 by fasteners 11. Projecting from the bracket base is a pair of horizontally spaced apertured ears 5a disposed on the inboard sides of brackets 5 for receiving pivot pins 19 that swingably mount the upper extent of the arms of back frame 17; a pair of vertically apertured ears 5b position adjacent ears 5a and cooperating with fastener pins 20 for securing U-shaped fabric fastener supports 5d to which fabric fasteners 8 are glued; and a vertically oriented apertured flange 5c at the outboard sides of brackets 5 for anchoring the side rails that are shown in FIG. 7 and are discussed more fully below.

Frame 17 is formed by a pair of rigid, elongate structural members 17a secured on opposite parallel sides of a lower back rest panel 17b such that the upper extents of members 17a project upwardly as arms which have transversely oriented pivot openings that cooperate with pivot pins 19. When thusly assembled, back frame 17 is swingably mounted from brackets 5 so that the lower extent of frame 17 can swing in a limited arc outwardly from wall 3 between the stowed position, as shown in FIG. 1, to a seating position in which frame 17 slopes downwardly and outwardly as shown in FIG. 2. Frame members 17a also project downwardly below the lower horizontal edge of back rest panel 17b to be engaged by and cooperate with backrest actuating cams mounted to brackets 9 and described more fully hereinafter. The middle height brackets 7 each have a vertically oriented apertured flange 7a projecting from a base of the bracket, and have a fabric fastener support ear 7b bent inboard at right angles to flange 7a for mounting the above-mentioned fabric fastener 8 that secures the upper back cushion 15. Also brackets 7 serve as anchoring point along with brackets 5 and 9 for securing the side rails as shown in FIG. 7 and discussed below.

Brackets 9 support the pivoted mounting of seat pan frame 23 and the associated camming mechanisms that actuate the back rest frame 17. For this purpose, each of brackets 9 are roughly channel shaped with the channel sides 9a and 9b vertically oriented and aligned under the corresponding upper and middle brackets 5 and 7 when mounted on wall 3. Sides 9a and 9b are provided with horizontally aligned pivot pin openings located at approximately midheight of the brackets 9 and adjacent the outwardly projecting edges of the sides 9a and 9b for receiving seat frame pivot pins as described below. The upper extents of channel sides 9a and 9b are cut back toward the base of the brackets 9 whereat another set of horizontally aligned openings are disposed for receiving cam pivot pins, one for each of brackets 9. As shown in FIGS. 3 and 4, each of brackets 9 is further formed with stops 9c that project outwardly from the base of the brackets between channel sides 9a and 9b, closer to the outboard side 9a, for contacting and stopping the upward rotation of reward extensions of the seat frame members. With further reference to FIG. 5, safety stops 9d (also shown in FIGS. 3 and 4), are provided on brackets 9 on the interior of channel sides 9a remote from the bracket bases and underlying the sides of the seat frame for catching and stopping downward movement of the seat should the seat frame pivot pins accidentally fail, in which event the seat frame is held between the main stops 9c and safety stops 9d.

As shown in FIG. 5, seat pan frame 23 is formed by a pair of elongate side members 23a which are secured along the outboard edges of a seat pan panel 23b. Members 23a continue rearwardly from a rear edge of panel 23b beyond the seat pivot points and terminate in rearward extensions that engage bracket stops 9c when the seat pan is folded down to a seating position. At the pivot points of members 23a, cam actuating crank arms 37 are affixed to the inboard sides of members 23a, projecting transversely from members 23.

Referring to FIGS. 3 and 4, wherein the cooperation between the seat back frame 17 and the seat pan frame 23 is shown in more detail, pivot pins 33 mount members 23a to the channel sides 9a, 9b of each lower bracket 9. Coaxial with pivot pin 33 is a seat return spring 35 which is anchored to the seat pan frame 23 and to the lower pivot bracket 9 to cause the seat pan frame 23 to automatically return to a stowed position when a seated occupant stands up. When the seat pan frame 23 is rotated down to a seating position, the cam actuating crank arm 37 at the pivot point of each of seat pan frame members 23a rotates counterclockwise.

Each crank arm 37 has a transversely projecting actuating pin 39 which travels in a lengthwise oriented slot 41 formed in an elongated seat back actuating cam 43, one end of which is pivotally connected to bracket 9 by a cam pivot pin 44 held between channel sides 9a and 9b. As the crank arm 37 rotates upwardly and forwardly in a counterclockwise movement when the seat pan is pulled down, the non-pivoted end 46 of cam 43 is forced upwardly and forwardly by pin 39 pressing cam end 46 into contact with surface 45 at the lower end 17c of the seat back frame member 17a. Reactively, the seat back frame 17 is caused to swing into a seating position, sloping downwardly and toward the front of the seat. Cam engagable surface 45 on member 17a faces rearwardly and is vertically enlongated with a rearward step 48 at the upper extent of its length to limit further upward rotation of cam 43 and stabilizing the cam in a generally horizontal orientation when the seat is fully open. As the seat is rotated downwardly from its closed position, the rearward extensions of seat frame members 23a rotate up into contact with stops 9c limiting the seat frame travel and disposing the seat in a generally horizontal seating position. A spring 47 connected between the seat back frame 17 and the lower pivot bracket 9 keeps the sliding surface 45 of the seat back frame 17 in contact with the cam 43 during actuation thereby.

Each of cams 43 are arranged so that with assembly 1 in a seating position, the relationship between the seat back frame 17 and the cam 43 is such that any horizontal force applied rearwardly to the front of the seat back frame 17 will be transmitted lengthwise through the cam 43, which bears the load in compression, and through the pivot axis thereof to bracket 9 and thence reacted into the wall 3 rather than imposing a rotative force on cam 43 and causing pan frame 23 to close. The result is a safer seat for the occupant while retaining the advantages of foldability.

Integrated with the components of seat assembly 1 is a restraint system 51 comprised of seat belt 52 and shoulder harness 53 as shown in FIGS. 6 and 7 and in which seat belt 51 and the lower ends of harness 53 are anchored to lower brackets 9 or directly to wall 3 adjacent the brackets, and in which harness 53 is donned and removed by loosening it with the aid of an inertial reel mounted behind the seat assembly. The shoulder harness 53 is an inverted Y configuration in which the merged harness straps 53a and 53b are sewn together at junction 57 as a superposed parallel unit that continues downwardly as a single web 58 (FIG. 8) for releasable retraction into an inertia reel 55 mounted on wall 3 between lower brackets 9 beneath the lower edge of back frame panel 17b, as illustrated in FIG. 7. The superposed webs of shoulder harness 53 are redirected from horizontal to vertical at a harness guide bracket assembly 59 which is mounted on the wall 3 by fasteners 60 (see FIGS. 9 and 10) at about the same height as the upper pivot brackets 5. Straps 53a and 53b slip through a gap between head cushion 13 and upper back cushion 15 to reach guide bracket assembly 59.

Figure 9:
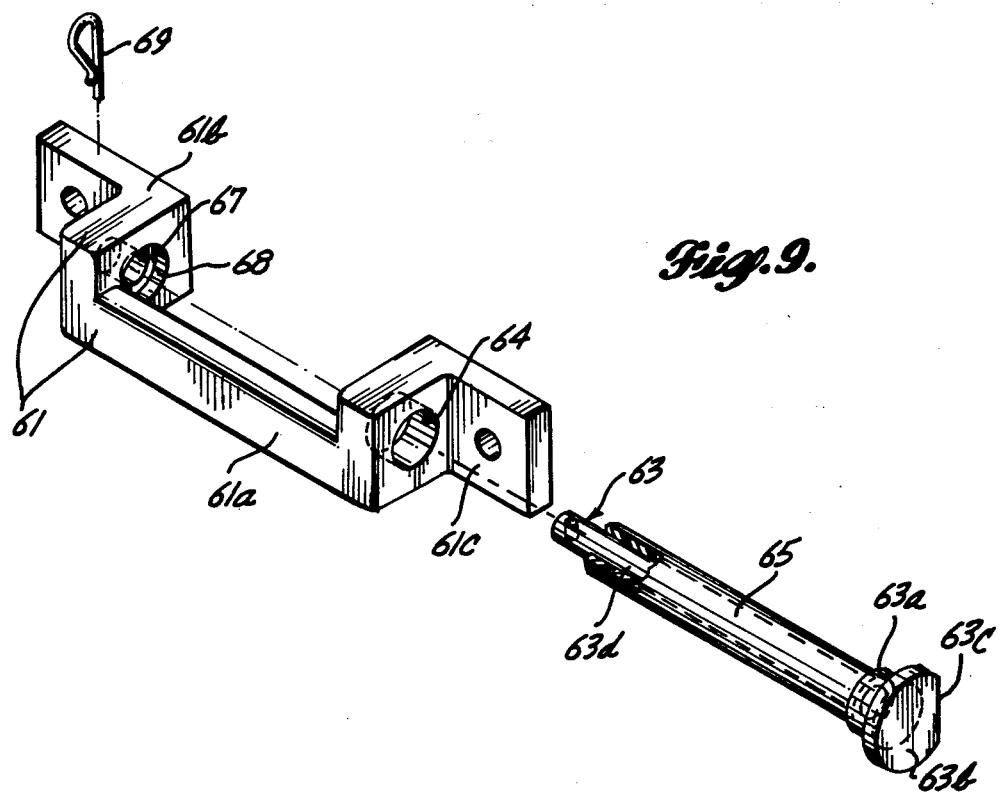
FIG. 9 is an exploded view of the harness guide bracket assembly of FIG. 8.
Figure 10:
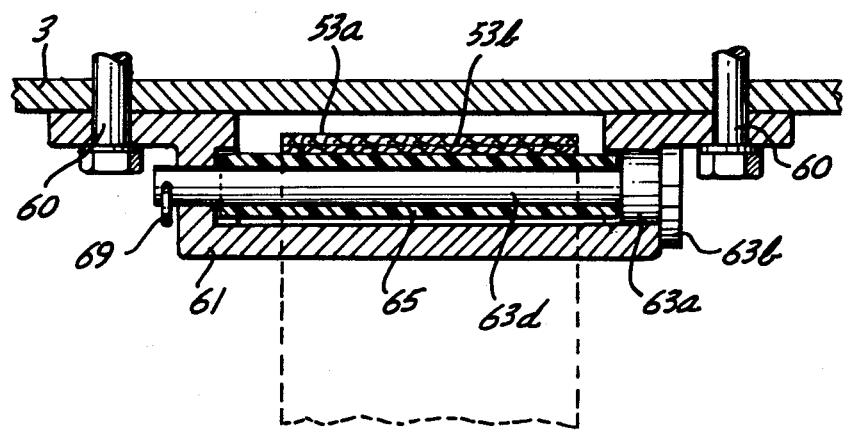
FIG. 10 is a lengthwise and horizontal sectional view of the harness guide bracket assembly of FIG. 8.

The components included in the harness guide bracket assembly 59, and the cooperation between the shoulder harness straps 53a and 53b and assembly 59 are illustrated in FIGS. 8 to 10. Guide bracket assembly 59 includes a hat shaped guide bracket 61 mounted on the wall 3, a roller pin 63, a roller sleeve 65, and a hitch pin 67. At one end of pin 63 is an enlarged diameter section 63a forming a shoulder, and a still larger diameter circular head 63b out of which a chordal section is removed, leaving a flat 63c.

When pin 63 is inserted in the guide bracket 61, flat 63c prevents pin 63 from rotating. Roller sleeve 65 loosely fits over the shaft 63d of pin 63 and is free to rotate when the parts are assembled.

On one side of bracket 61, a pin opening 64 is sized to receive enlarged diameter section 63a which has an axial dimension less than the thickness of the bracket wall at opening 64 so that the adjacent end of sleeve 65 extends into opening 64 and abuts the shoulder at section 63a, thereby recessing the sleeve end so as to prevent binding of the edges of the guided straps between sleeve 65 and the side of bracket 61. Similarly, the opposite side of bracket 61 has an opening 66 sized to fit the end of shaft 63d and a counter bore 67 on the inward face of the bracket wall large enough to recess the adjacent end of sleeve 65 for the above mentioned purpose. In the illustrated embodiment, a section of the central wall 61a of guide bracket 61 is reduced in width to allow shoulder harness straps 53a and 53b to ride onto sleeve 65 as the shoulder harness 53 horizontally ann rearwardly enters the harness guide bracket assembly 59. At the end of pin 63 opposite the head 63b, a transverse hitch pin hole 69 is drilled to receive hitch pin 69 after pin 63 and sleeve 65 have been inserted through the bracket opening 64.

In operation, the straps 53a and 53b are guided between side walls of bracket 61 which are spaced apart no greater than 1½ times the width of the straps such that the straps diverge forwardly of the bracket to pass across opposite shoulders of the occupant, and merge at the bracket into the above mentioned, substantially parallel, superposed relationship as the straps turn downwardly toward sewn junction 57 and inertial reel 55. By forming straps 53a and 53b into the parallel, superposed sonfiguration as they are guided by bracket assembly 59, smooth, non-binding retraction and extension of the shoulder harness is achieved while still providing the necessary divergence of the straps forward of assembly 59.

Installation of seat assembly 1 is quickly and easily accomplished by separately mounting pairs of brackets 5, 7, and 9 to wall 3 in the pattern shown in FIG. 5, and by separately attaching inertial reel 55 and strap guide assembly 59 prior to mounting the back frame 17 and seat pan frame 23 to brackets 5 and 9, respectively, such that wall 3 serves as both the connective structure for the various assembly components and as the wall support. The final assembly operation is the attachment of side panels 49 (FIG. 7) which are held by suitable fasteners, such as quick release quarter-turn fasteners, to the vertically aligned bracket 5, 7, and 9 on each side of the assembly. Removal of the seat assembly for repair or replacement entails the reverse sequence. Alternatively, the seat frame 23 and brackets 9 with pivot pins 33 and springs 35 connected, can be installed and removed as a subassembly, as can the seat back frame 17 with its associated brackets 5 and pivot pins 19 preconnected.

While only a particular embodiment has been disclosed herein, it will be readily apparent to persons skilled in the art that numerous changes and modifications can be made thereto including the use of equivalent means and devices without departing from the spirit of the invention.

The embodiments of the invention in which an exclusive property or privilege is claimed are defined as follows:

1. A folding seat assembly for mounting on a wall, comprising:
    seat support bracket means adapted to be mounted on a wall;
    seat pan frame having front and rear extents;
    seat back frame having upper and lower extents;
    a first pivot means connecting said seat pan frame adjacent its rear extent to said support bracket means for limited articulation of said seat pan between a generally horizontal seating position and a generally vertical stowed position when said bracket means are mounted on a wall;
    a second pivot means connecting said seat back frame, adjacent its upper extent, to said support bracket means for limited swinging movement of the lower extent of said seat back frame between a seating position and a stowed position when said support bracket means are mounted on a wall;
    a seat back actuating cam having an elongated body slotted lengthwise and being pivotally connected at one of its ends to said support bracket means adjacent the lower extent of said seat back frame for limited rotation between a generally vertical, out-of-the-way position and a generally horizontal load reacting position in which a second end of said cam body contacts and displaces said seat back frame to its seating position;
    a cam actuating crank arm affixed to said seat pan frame so as to rotate therewith, said crank arm cooperating with the slot in said cam body so as to effect said rotation of said cam between its generally vertical and horizontal positions when said seat pan frame is articulated from its stowed position to its seating position, said crank arm and slotted cam body arranged and cooperating with said seat back and seat pan frames so that rearwardly directed loads on said seat back frame adjacent the lower extent thereof are reacted by said cam, in compression, against said support means without applying a rotative force to said crank arm.

2. A folding seat assembly as recited in claim 1, further comprising:
    a lower back cushion covering said seat back frame;
    a seat cushion covering said seat pan frame;
    said lower back cushion having a tapering contour to mate with a complementary tapering contour of said seat cushion when folding seat assembly is in a closed position, so that bottom surface of said seat pan frame is parallel to back of said seat back frame, and the complementary contour surfaces are in contact with each other.

3. A folding seat assembly as recited in claim 1, further comprising:
   a plurality of upper pivot brackets adapted to be mounted to said wall;
   a plurality of middle brackets adapted to be mounted to said wall;
   a plurality of lower pivot brackets adapted to be mounted to said wall;
   a seat back frame pivotally connected to said upper pivot brackets;
   a seat pan frame pivotally connected to said lower pivot brackets;
   said wall serving as a connective structure for the folding seat assembly.

4. A folding seat assembly as recited in claim 1 with a seat belt and retractable shoulder harness restraint system further comprising:
   a guide bracket;
   a bracket pin;
   a bracket pin sleeve;
   said guide bracket mounted on said wall;
   said bracket pin assembled coaxially with said bracket pin sleeve and inserted through said guide bracket parallel with said wall;
   said bracket pin sleeve being rotatable around said bracket pin as said shoulder harness traverses through said guide bracket;
   said bracket pin having a means for preventing said bracket pin from rotating as said shoulder harness traverses through said guide bracket;
   said bracket pin sleeve having such a relationship with said guide bracket to prevent said shoulder harness from becoming pinched between said guide bracket and end of said bracket pin sleeve;
   said bracket pin having a means for locking said bracket pin into said guide bracket.

* * * * *